(12) United States Patent
Garnier et al.

(10) Patent No.: US 12,104,497 B2
(45) Date of Patent: Oct. 1, 2024

(54) ASSEMBLY FOR A TURBINE COMPRISING SECTORS WITH LAMINATED SEALING TONGUES

(71) Applicant: SAFRAN CERAMICS, Le Haillan (FR)

(72) Inventors: Gildas Garnier, Moissy-Cramayel (FR); Jean-François Henne, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 18/250,898

(22) PCT Filed: Oct. 27, 2021

(86) PCT No.: PCT/FR2021/051890
§ 371 (c)(1),
(2) Date: Apr. 27, 2023

(87) PCT Pub. No.: WO2022/090667
PCT Pub. Date: May 5, 2022

(65) Prior Publication Data
US 2023/0392515 A1 Dec. 7, 2023

(30) Foreign Application Priority Data

Oct. 30, 2020 (FR) ..................... 2011153

(51) Int. Cl.
*F01D 25/00* (2006.01)
*F01D 9/04* (2006.01)
(Continued)

(52) U.S. Cl.
CPC ............ *F01D 25/005* (2013.01); *F01D 9/04* (2013.01); *F01D 11/005* (2013.01);
(Continued)

(58) Field of Classification Search
CPC .... F01D 11/001; F01D 11/005; F01D 11/006; F01D 11/008; F01D 11/08; F01D 9/04;
(Continued)

(56) References Cited

U.S. PATENT DOCUMENTS 5,997,247 A * 12/1999 Arraitz ................. F01D 9/02
277/654
7,334,800 B2 * 2/2008 Minnich ............... F01D 11/005
277/654

(Continued)

FOREIGN PATENT DOCUMENTS

| EP | 3 626 934 A1 | 3/2020 |
| WO | WO 2014/150147 A1 | 9/2014 |
| WO | WO 2017/060604 A1 | 4/2017 |

OTHER PUBLICATIONS

International Search Report as issued in International Patent Application No. PCT/FR2021/051890, dated Feb. 23, 2022.

(Continued)

*Primary Examiner* — David E Sosnowski
*Assistant Examiner* — Maxime M Adjagbe
(74) *Attorney, Agent, or Firm* — Pillsbury Winthrop Shaw Pittman LLP

(57) ABSTRACT

An assembly for a turbine includes a plurality of sectors which are adjacent to one another, each sector including at least one connecting edge of composite material with a ceramic matrix, each connecting edge including at least one groove and a sealing tongue present in each groove. Each sealing tongue has a laminated structure comprising a plurality of strips the lower strip and the upper strip of the laminated structure, each being formed by a film of monolithic ceramic material.

8 Claims, 4 Drawing Sheets

(51) Int. Cl.
    *F01D 11/00*    (2006.01)
    *F01D 25/24*    (2006.01)

(52) U.S. Cl.
    CPC ........ *F01D 25/246* (2013.01); *F05D 2300/20* (2013.01); *F05D 2300/6033* (2013.01)

(58) Field of Classification Search
    CPC ......... F05D 2300/6033; F05D 2300/20; F05D 2240/11; F05D 2240/55
    See application file for complete search history.

(56) References Cited

U.S. PATENT DOCUMENTS

| | | | |
|---|---|---|---|
| 9,598,973 B2 * | 3/2017 | Ghasripoor | F01D 11/122 |
| 2011/0020113 A1 | 1/2011 | Beeck et al. | |
| 2011/0236183 A1 * | 9/2011 | Amaral | F16J 15/0887 |
| | | | 277/654 |
| 2017/0370239 A1 | 12/2017 | Venkataramani et al. | |
| 2019/0153886 A1 | 5/2019 | Vetters et al. | |
| 2020/0095880 A1 * | 3/2020 | Clark | F01D 11/08 |
| 2020/0355089 A1 * | 11/2020 | Razzell | F01D 11/08 |

OTHER PUBLICATIONS

Written Opinion of the International Searching Authority as issued in International Patent Application No. PCT/FR2021/051890, dated Feb. 23, 2022.

* cited by examiner

[Fig. 1A]
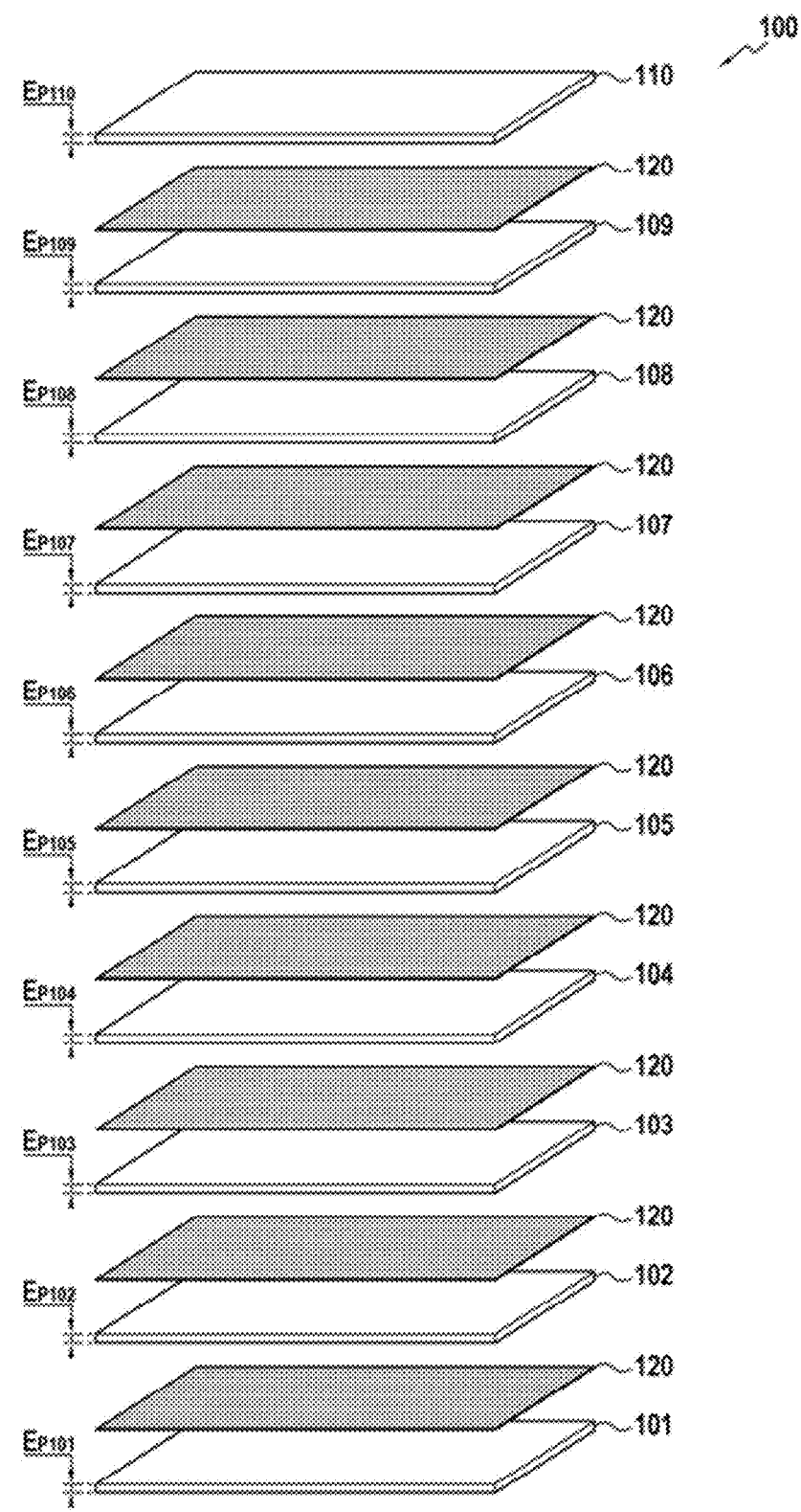

[Fig. 1B]
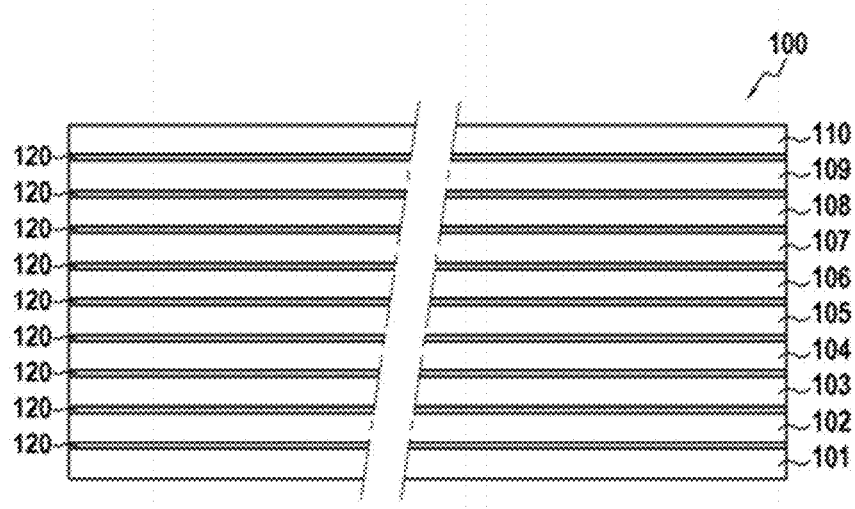
[Fig. 2A]
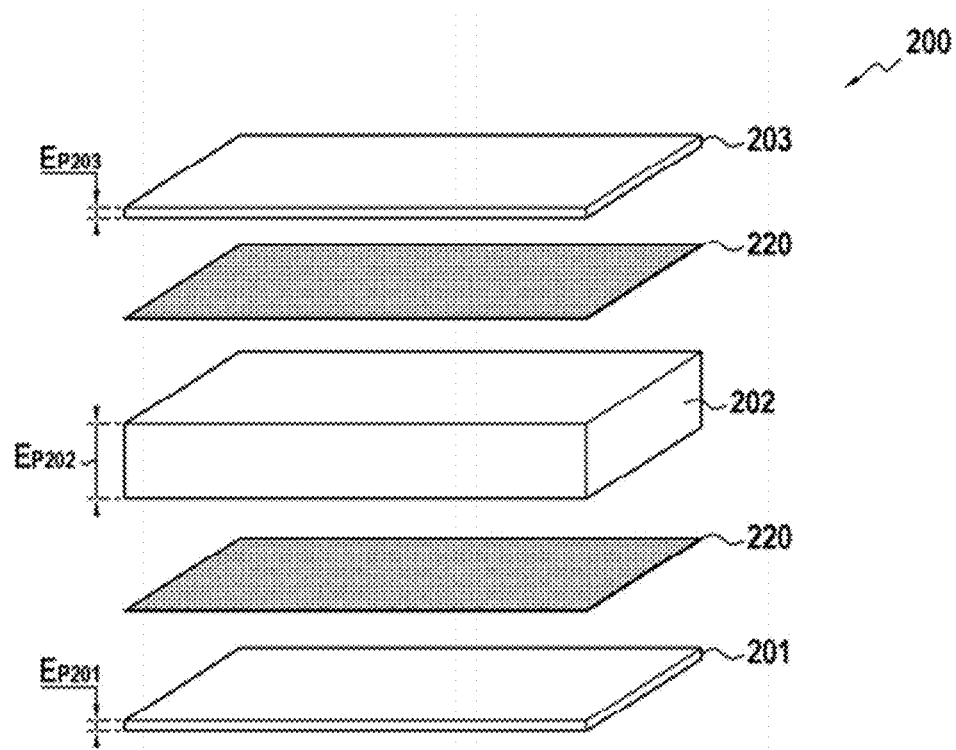

[Fig. 2B]
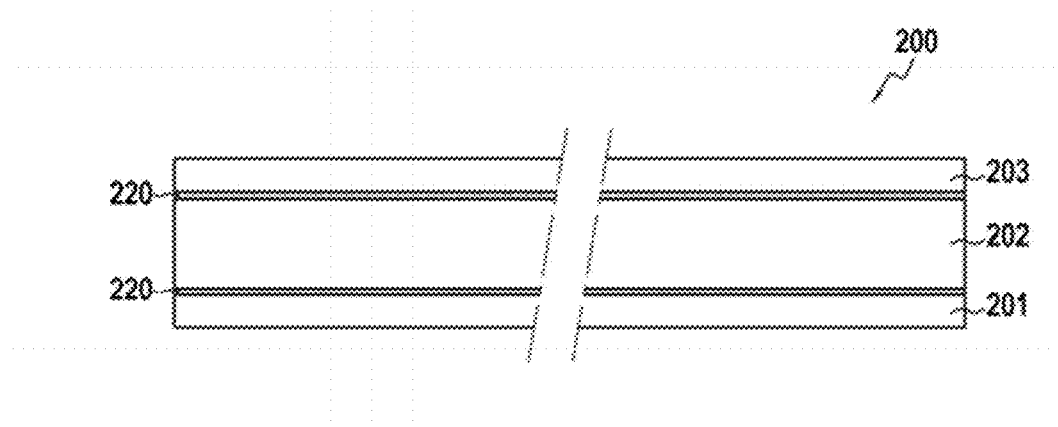
[Fig. 3]
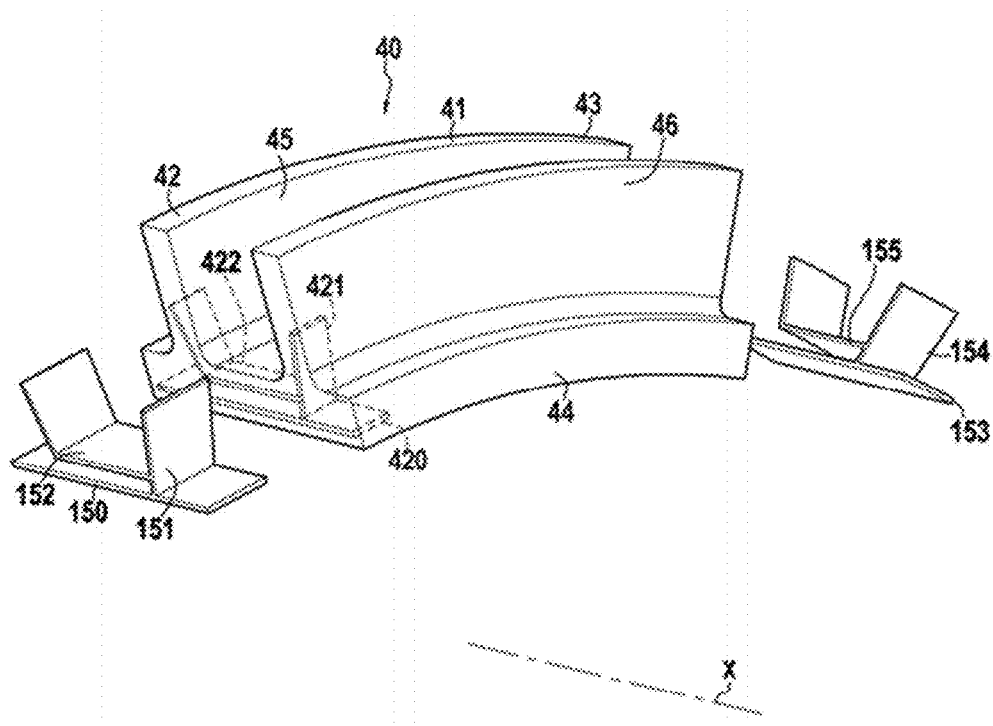

[Fig. 4]
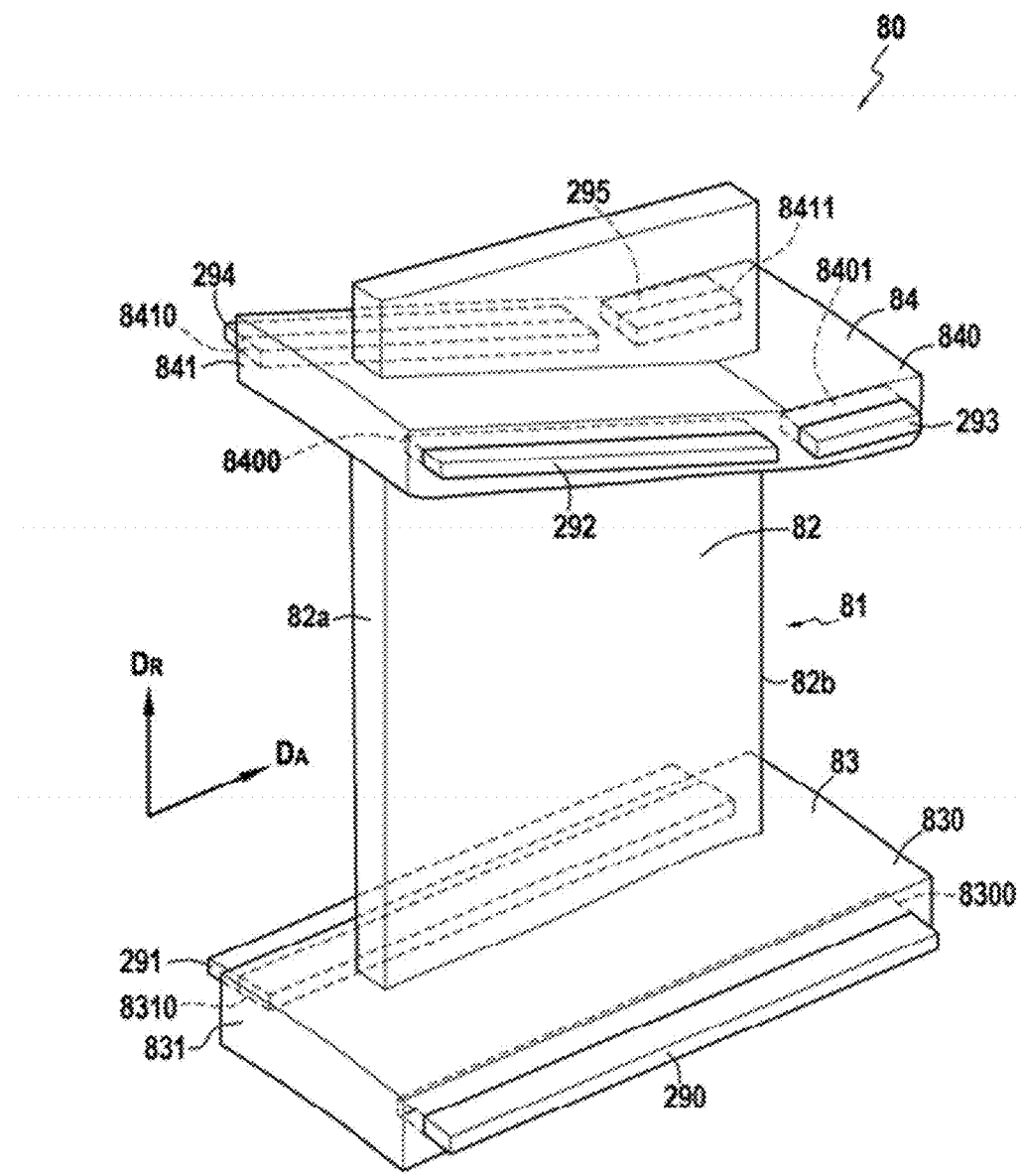

ASSEMBLY FOR A TURBINE COMPRISING SECTORS WITH LAMINATED SEALING TONGUES

CROSS-REFERENCE TO RELATED APPLICATIONS

This application is the U.S. National Stage of PCT/FR2021/051890, filed Oct. 27, 2021, which in turn claims priority to French patent application number 20 11153 filed Oct. 30, 2020. The content of these applications are incorporated herein by reference in their entireties.

TECHNICAL FIELD

The present invention relates to turbomachine or gas turbine parts between which sealing must be achieved by means of at least one sealing tongue present in grooves or housings at the connecting edges of adjacent parts.

The invention relates for example, but not exclusively, to a turbine ring set for a turbomachine, which set comprises a plurality of ring sectors of composite material with a ceramic matrix. Sealing between adjacent ring sectors is achieved by one or more sealing tongues housed in grooves machined in the connecting edges of the sectors.

Composite materials with a ceramic matrix, or CMC, are known for their good mechanical properties which make them suitable for constituting structural elements, and for their ability to retain these properties at high temperatures. The use of CMC for various hot portions of aeronautical engines has already been considered, especially since CMCs have a lower density than that of refractory metals conventionally used.

The production of a turbine ring set from CMC ring sectors is described in particular in document WO 2017/060604. Sealing between adjacent ring sectors is achieved by one or more sealing tongues housed in grooves machined in the connecting edges of the sectors.

The CMC material developed for turbines is generally based on silicon carbide (SiC) fibers and on SiC matrix. However, due to its manufacturing range, the material still contains silicon in metallic form, called "free silicon".

The tongues currently used for sealing between the sectors are made of nickel based or cobalt based alloys (for example: HA188). These alloys are chosen for their mechanical strength at high temperature and their resistance to oxidation.

The free silicon can react at high temperature with the Nickel or the Cobalt of the alloy, typically above 700° C. In addition to the temperature activated solid phase diffusion, there may be the formation of a low melting point eutectic which will strongly degrade the CMC and the metal. These reactions are called "CMC/Metal interaction". However, the metal tongues housed in the sealing grooves are potentially subjected to temperatures above 700° C. and will thus react with the CMC in the machined housing.

There is therefore a need to achieve a sealing between parts of a sectorized set without the risk of chemical reaction or diffusion at high temperature.

DISCLOSURE OF THE INVENTION

To this end, the invention proposes an assembly for a turbine comprising a plurality of sectors which are adjacent to one another, each sector comprising at least one connecting edge of composite material with a ceramic matrix (CMC), each connecting edge comprising at least one groove or a housing and a sealing tongue present in each groove or housing, characterized in that each sealing tongue has a laminated structure comprising a plurality of strips, the upper strip and the lower strip of the laminated structure each being formed by a film of monolithic ceramic material.

The portions of the sealing tongue(s) intended to be in contact with the CMC of the sectors of the assembly, namely the lower and upper faces, formed by a film of ceramic material which is chemically inert with respect to CMC material. This avoids any risk of chemical reaction or diffusion at high temperature between the sealing tongues and the CMC material of the sectors.

Furthermore, each sealing tongue has a laminated structure which gives it greater flexibility and, therefore, good resistance to deformations encountered in operation and/or to adapt to the shape of the groove in which it is intended to be housed (for example angled groove) and thus optimize the sealing.

According to a particular characteristic of the assembly of the invention, the film of monolithic ceramic material has a thickness less than or equal to 50 µm.

According to one embodiment of the assembly of the invention, each sealing tongue comprises one or more intermediate strips present between the lower strip and the upper strip of the laminated structure, each intermediate strip being formed by a film of monolithic ceramic material. According to a particular aspect of this embodiment. The film of monolithic ceramic material constituting each intermediate strip may have a thickness less than or equal to 50 µm.

According to another embodiment of the assembly of the invention, each sealing tongue comprises one or more intermediate metallic material strips present between the lower strip and the upper strip of the laminated structure. According to a particular aspect of this embodiment, the intermediate metallic material strip(s) are made of a nickel or cobalt based alloy.

According to another particular characteristic of the assembly of the invention, the films of monolithic ceramic material are made of a material selected from: SiC, $Si_3N_4$ and any type of oxide ceramic material of the $Al_2O_3$, YSZ or silicalate type.

According to another particular characteristic of the assembly of the invention, a fugitive binder is present between the adjacent strips of the laminated structure.

According to another particular characteristic of the assembly of the invention, the sectors are turbine ring sectors each comprising an annular base having an internal face intended to define the internal face of a turbine ring when the ring sector is mounted to a ring support structure and an external face from which extends one or more portions for hooking the ring sector to the ring support structure, each ring sector further comprising two inter-sector connecting edges of composite material with a ceramic matrix present at the circumferential ends of the sector, each inter-sector connecting edge being intended to face a neighboring ring sector when the ring sector is mounted on the ring support structure, each inter-sector connecting edge including one or more grooves in which a sealing tongue is partially housed.

According to another particular characteristic of the assembly of the invention, the sectors are distributor sectors comprising a sector structural body including an aerodynamic profile extending in a radial direction between a lower platform and an external platform and, along a axial direction, between a leading edge and a trailing edge, said sector further comprising two inter-platform connecting edges of composite material with a ceramic matrix present at the circumferential ends of each platform, each inter-platform connecting edge being intended to be opposite a platform of a neighboring sector, each inter-platform connecting edge including one or more grooves in which a sealing tongue is partially housed.

BRIEF DESCRIPTION OF THE DRAWINGS

FIG. 1A is a schematic exploded perspective view of a sealing tongue in accordance with one embodiment of the invention, FIG. 1B is a schematic perspective view of the sealing tongue of FIG. 1A when assembled, FIG. 2A is a schematic exploded perspective view of a sealing tongue in accordance with another embodiment of the invention, FIG. 2B is a schematic perspective view of the sealing tongue of FIG. 1A when assembled, FIG. 3 is a schematic perspective view of the turbine ring sector provided with sealing tongues according to the invention, FIG. 4 is a schematic perspective view of a turbine stator sector provided with sealing tongues according to the invention.

DESCRIPTION OF EMBODIMENTS

The invention applies generally to any set or assembly for a turbine comprising a plurality of sectors which are adjacent to one another by connecting edges of composite material with a ceramic matrix or CMC, each connecting edge including at least one groove or housing and a sealing tongue present in each groove.

FIGS. 1A and 1B illustrate a sealing tongue 100 in accordance with one embodiment of the invention. The sealing tongue 100 has a laminated structure comprising a plurality of strips 101 to 110. The lower strip 101 constitutes the lower face of the tongue 100 which is intended to contact a lower portion of a groove present on one edge connecting a sector of an assembly for a turbine as explained below. The upper strip 110 constitutes the upper face of the tongue 100 which is intended to contact an upper portion of a groove present on a connecting edge of a sector of an assembly for a turbine.

In accordance with the invention, the lower and upper strips are each formed by a film of monolithic ceramic material. This avoids any chemical reaction or diffusion between the CMC material of the connecting edge and the sealing tongue because the contact surfaces of the tongue are made of a material that is chemically inert with respect to the CMC material.

The monolithic ceramic material film of the upper strip 101 and of the lower strip 110 preferably has a thickness $E_{P101}$, $E_{P110}$ of less than or equal to 50 μm so as to give the upper and lower strips good flexibility with respect to modes of biasing the sealing tongues which correspond to deformations mainly in bending. The film of monolithic ceramic material may for example have a thickness comprised between 10 μm and 50 μm.

In the example described here, the sealing tongue 100 also comprises several intermediate strips 102 to 109 present between the lower strip 101 and the upper strip 110 of the laminated structure. The intermediate strips here each formed by a film of monolithic ceramic material, for example of the same type as the ceramic material of the films of the lower and upper strips. As for the lower strip 101 and the upper strip 110, the constituent films of the intermediate strips 102 to 109 have a thickness $E_{P102}$ to $E_{P109}$ less than or equal to 50 μm, for example comprised between 10 μm and 50 μm.

The juxtaposition of several independent thin strips made of monolithic ceramic material allows to obtain the necessary flexibility for the sealing tongue which cannot be obtained with a sealing tongue being formed by a single thick strip made of monolithic ceramic material due to the fragile nature of monolithic ceramics. In other words, the use of a plurality of independent thin strips made of monolithic ceramic material allows to obtain the flexibility necessary to adapt to the deformations encountered in operation without risk of breakage and/or to adapt to the shape of the groove in which it is intended to be housed (for example angled groove) and thus optimize sealing.

According to an optional characteristic of the invention, layers of fugitive binder 120 can be interposed between the adjacent strips 101 to 110 of the laminated structure as illustrated in FIG. 1A. The fugitive binder layers 120 allow to facilitate the assembly of the sealing tongue by ensuring maintenance between all the strips of the laminated structure. The binder being fugitive, it is quickly eliminated from the first raise in temperature of the sealing strip.

FIGS. 2A and 2B illustrate a sealing tongue 200 in accordance with another embodiment of the invention which differs from the sealing tongue 100 previously described in that a metallic material strip is present between the lower and upper strips made of monolithic ceramic material. More specifically, as for the tongue 100, the sealing tongue 200 has a laminated structure comprising three strips 201 to 203.

The lower strip 201 constitutes the lower face of the tongue 200 which is intended to contact a lower portion of a groove present on a connecting edge of a sector of an assembly for a turbine, while the upper strip 203 constitutes the upper face of the tongue 200 which is intended to contact an upper portion of a groove present on a connecting edge of a sector of a turbine assembly.

The film of monolithic ceramic material of the upper strip 201 and of the lower strip 203 preferably has a thickness $E_{P201}$, $E_{P203}$ of less than or equal to 50 μm so as to give the upper and lower strips good flexibility with respect to modes of biasing the sealing tongues which correspond to deformations mainly in bending. The film of monolithic ceramic material may for example have a thickness of between 10 μm and 50 μm.

In the example described here, the sealing tongue 100 also comprises an intermediate metallic material strip 202 present between the lower strip 201 and the upper strip 203 of the laminated structure. The intermediate metallic material strip 202 may have a thickness $E_{P202}$ greater than 50 μm, for example between 100 μm and 400 μm. The intermediate strip 202 can be made of a nickel- or cobalt-based alloy.

Chemical reactions or diffusion between the metallic material of the intermediate strip and the CMC of the connecting edge are avoided with the sealing tongue 200 because the intermediate strip 202 is covered by the lower strip 201 and the upper strip 203 which form the surfaces of contact of the tongue with the CMC material of the connecting edge, the lower and upper strips being made of a material that is chemically inert with respect to the CMC material.

According to an optional characteristic of the invention, layers of fugitive binder 220 can be interposed between the adjacent strips 201 to 203 of the laminated structure as illustrated in FIG. 2A. The fugitive binder layers 220 make it easier to mount the sealing tongue by ensuring that the lower and upper strips 201 and 203 are held on the intermediate strip 202. The binder being fugitive, it is quickly eliminated from the first rise in temperature of the sealing tongue.

According to a variant embodiment, the sealing tongue 200 can comprise several intermediate metallic material strips.

The films of monolithic ceramic material used to form the lower and upper strips as well as the intermediate strips as in the sealing tongues 100 and 200 described previously can be made in particular with a monolithic ceramic material selected from: SiC, $Si_3N_4$, and any oxide ceramic material of the $Al_2O_3$, YSZ (yttria-stabilized zirconia) or silicalate type.

The sealing tongues which have just been described are used to produce a sealing between the sectors of an assembly for a turbine, the assembly possibly corresponding in particular to a turbine ring or a sectorized distributor.

FIG. 3 illustrates a ring sector 40 having a substantially inverted 7c-shaped cross-section with an annular base 44 whose internal face defines the gas stream flow path in a turbine. Upstream and downstream lugs 45, 46 extend from the external face of the annular base 44 and are intended to be fixed to annular flanges of a ring support structure not represented in FIG. 3. The ring sector 40 is a sector of a plurality of ring sectors together constituting a turbine ring, a sealing being achieved between all adjacent ring sectors of the ring.

The turbine ring sector 40 is made of composite material with a ceramic matrix (CMC) and includes two inter-sector connecting edges 42 and 43 present respectively at the circumferential ends of the sector 40. The connecting edge 42 includes a first groove 420 receiving a portion of a first sealing tongue 150, a second groove 421 receiving a portion of a second sealing tongue 151 and a third groove 422 receiving a portion of a third sealing tongue 152. The connection edge 43 also includes three grooves, not shown in FIG. 3, similar to the grooves 420, 421 and 422 of the inter-sector connecting edge 42 respectively receiving portions of tongues respectively identical to the tongues 153, 154 and 155.

In the example described here, the sealing tongues 150 to 155 have a laminated structure comprising a plurality of strips each being formed by a film of monolithic ceramic material as for the sealing tongue 100 described above. However, the sealing tongues 150 to 155 can also have a laminated structure with a metal core as for the sealing tongue 200 described above.

The laminated structure of the tongues 150 to 155 gives them a flexibility which allows to conform the tongues to the shape of the grooves without risk of breakage. Indeed, with its laminated structure, the tongue according to the invention has a very good resistance against the stresses encountered during its use which are mainly in bending and torsion. In particular, the tongues 152 and 155 can be shaped in a bent shape so as to adapt to the shape respectively of the groove 422 present on the connecting edge 42 and to the shape of the groove (not shown in FIG. 3) present on the connecting edge 43. Such shaping cannot be obtained with a sealing tongue being formed by a single thick monolithic ceramic element without risk of breakage.

FIG. 4 illustrates a turbomachine part corresponding to a turbine distributor sector The distributor sector 80 includes a sector structural body 81 made of CMC material comprising an aerodynamic profile 82 extending in a radial direction $D_R$ between a lower platform 83 and an external platform 84 and, in an axial direction $D_A$, between a leading edge 82a and a trailing edge 82b. The distributor sector 80 is one of a plurality of distributor sectors together constituting a turbine distributor, a sealing being achieved between all adjacent distributor sectors of the distributor.

The turbine ring sector 80 further comprises at the lower platform 83 two inter-platform connecting edges 830 and 831 present respectively at the circumferential ends of the lower platform 83. Similarly, the turbine ring sector 80 comprises at the external platform 84 two inter-platform connecting edges 840 and 841 present respectively at the circumferential ends of the external platform 84.

The connecting edges 830 and 831 respectively include a groove 8300 and a groove 8310, the groove 8300 receiving a portion of a first sealing tongue 290 while the groove 8310 receives a portion of a second sealing tongue 291. The connecting edge 840 includes two grooves 8400 and 8401 respectively receiving a portion of a third and fourth sealing tongues 292 and 293. The connecting edge 841 also includes two grooves 8410 and 8411 respectively receiving a portion of a fourth sealing tongue 294 and a portion of a fifth sealing tongue 295.

In the example described here, the sealing tongues 290 to 295 have a laminated structure comprising a metal core being formed by one or more metallic material strips and lower and upper strips each being formed by a film of monolithic ceramic material as for the sealing tongue 200 described above. However, the sealing tongues 290 to 295 can also have a laminated structure comprising a plurality of strips formed by a film of monolithic ceramic material as for the sealing tongue 100 described above.

The laminated structure of the tongues 209 to 295 gives them a flexibility which allows to conform the tongues to the shape of the grooves without risk of breakage.

The invention claimed is:

1. An assembly for a turbine comprising a plurality of sectors which are adjacent to one another, each sector comprising at least one connecting edge of composite material with a ceramic matrix, each connecting edge comprising at least one groove or a housing and a sealing tongue present in each groove or housing, wherein each sealing tongue has a laminated structure comprising a plurality of strips, the lower strip and the upper strip of the laminated structure each being formed by a film of monolithic ceramic material, wherein each strip of the plurality of strips made of a film of monolithic ceramic material has a thickness of less than or equal to 50 µm.

2. The assembly according to claim 1, wherein each sealing tongue comprises one or more intermediate strips present between the lower strip and the upper strip of the laminated structure, each intermediate strip being formed by a film of monolithic ceramic material.

3. The assembly according to claim 1, wherein each sealing tongue comprises one or more intermediate metallic material strips present between the lower strip and the upper strip of the laminated structure.

4. The assembly according to claim 3, wherein the intermediate metallic material strip(s) are made of a nickel or cobalt based alloy.

5. The assembly according to claim 1, wherein the films of ceramic material are made of a material selected from: SiC, $Si_3N_4$, $Al_2O_3$, YSZ, silicalate.

6. The assembly according to claim 1, wherein a fugitive binder is present between the adjacent strips of the laminated structure.

7. The assembly according to claim 1, wherein the plurality of sectors are turbine ring sectors each comprising an annular base having an internal face intended to define the internal face of a turbine ring when the ring sector is mounted to a ring support structure and an external face from which extends one or more portions for hooking the ring sector to the ring support structure, each ring sector further comprising two inter-sector connecting edges of composite material with a ceramic matrix present at circumferential ends of the sector, each inter-sector connecting edge being intended to face a neighboring ring sector when the ring sector is mounted on the ring support structure, each inter-sector connecting edge including one or more grooves in which one or more sealing tongues is partially housed.

8. The assembly according to claim 1, wherein the plurality of sectors are distributor sectors, each distributor sector comprising a sector structural body including an aerodynamic profile extending in a radial direction between a lower platform and an external platform and, in an axial direction, between a leading edge and a trailing edge, said distributor sector further comprising two inter-platform connecting edges of composite material with a ceramic matrix present at circumferential ends of each platform, each inter-platform connecting edge being intended to be opposite a platform of a neighboring sector, each inter-platform connecting edge including one or more grooves in which a sealing tongue is partially housed.

\* \* \* \* \*